Nov. 1, 1927.

E. O. HUTSELL 1,647,867

LAWN MOWER

Filed June 24, 1925    3 Sheets-Sheet 1

WITNESSES
Chas. L. McDonald
E. N. Lovewell

INVENTOR
Ernest O. Hutsell

BY

ATTORNEY

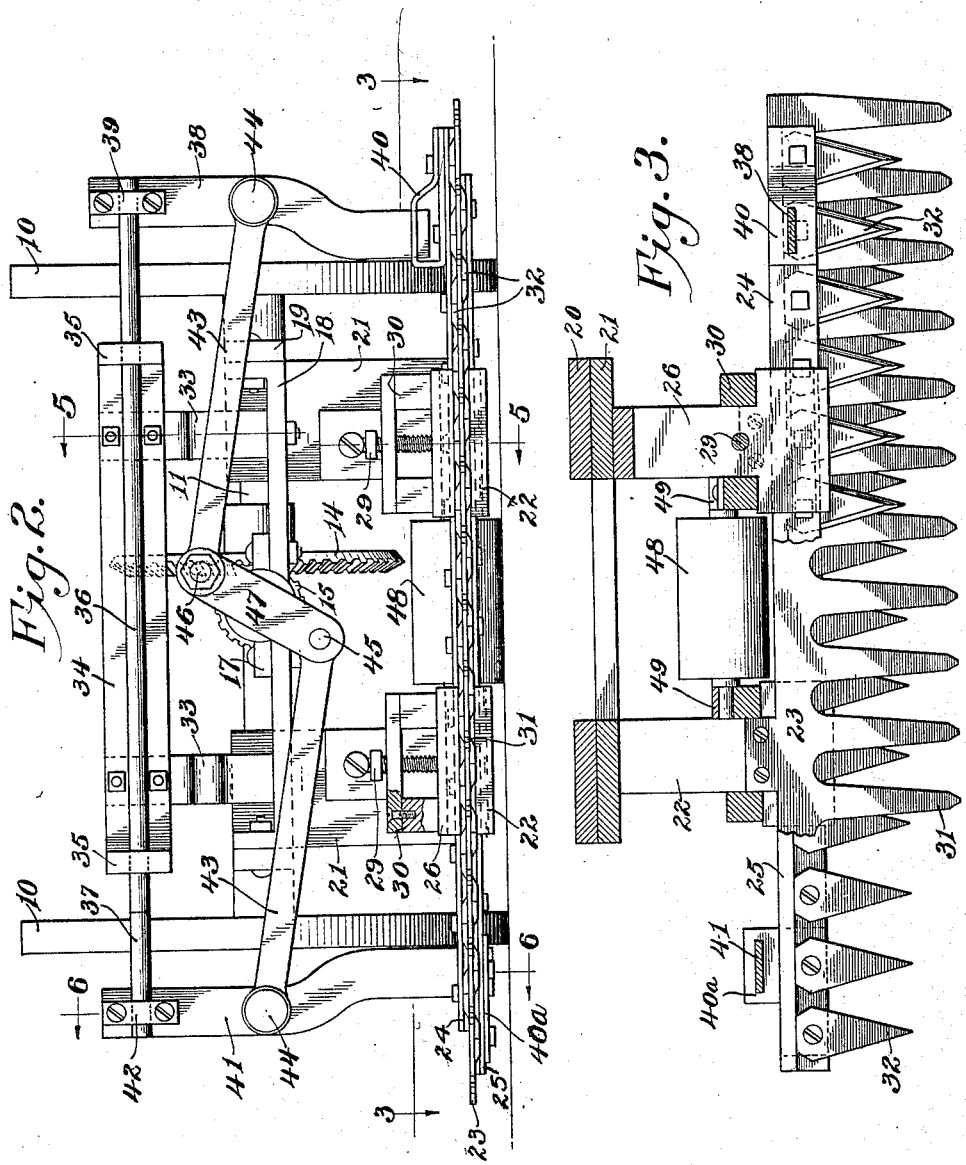

Nov. 1, 1927.
E. O. HUTSELL
1,647,867
LAWN MOWER
Filed June 24, 1925
3 Sheets-Sheet 3
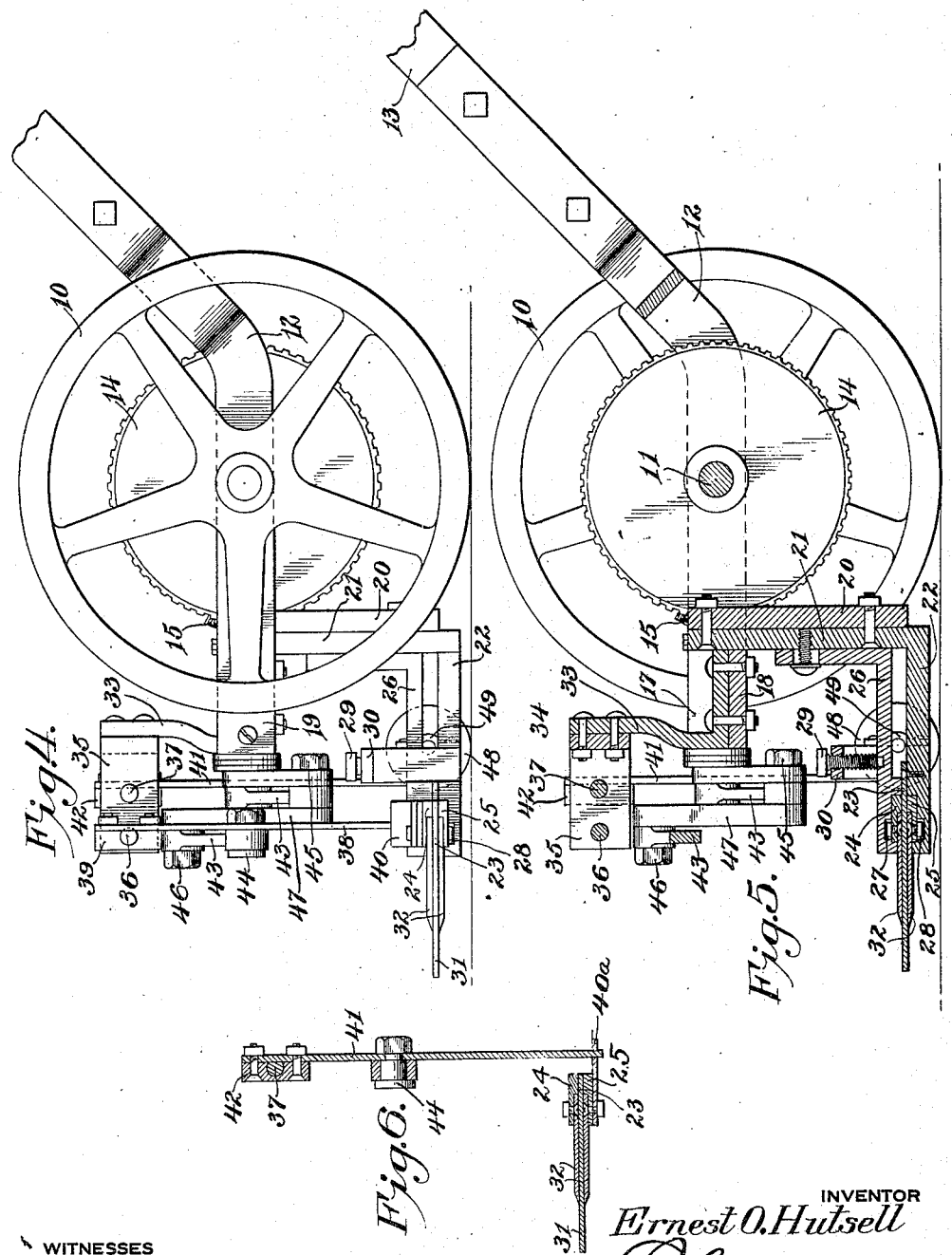

Patented Nov. 1, 1927.

1,647,867

UNITED STATES PATENT OFFICE.

ERNEST OLANDER HUTSELL, OF ATHENS, TENNESSEE, ASSIGNOR OF ONE-HALF TO CHARLES L. FOWLER, OF ATHENS, TENNESSEE.

LAWN MOWER.

Application filed June 24, 1925. Serial No. 39,350.

This invention relates to an improved lawn mower having reciprocating cutters mounted and guided on a finger bar, and driven by the ground wheels as the mower is pushed over the ground.

The invention has for its object to provide a lawn mower of this type which is simple in its construction, easy to operate, and which has improved means for supporting and guiding the cutters, and for driving the same.

The invention consists further in various improved details of construction and combinations of elements, the nature and purpose of which will be more particularly explained in connection with the accompanying drawings which illustrate the preferred embodiment thereof.

In the drawings:

Figure 2 is a front elevation thereof.

Figure 3 is a sectional view taken substantially on the line 3—3 of Figure 2, a portion of the finger bar and upper knife bar being broken away.

Figure 4 is a side elevation of the invention.

Figure 5 is a vertical longitudinal section taken substantially on the line 5—5 of Figure 2.

Figure 6 is a vertical section taken on the line 6—6 of Figure 2.

Figure 1:
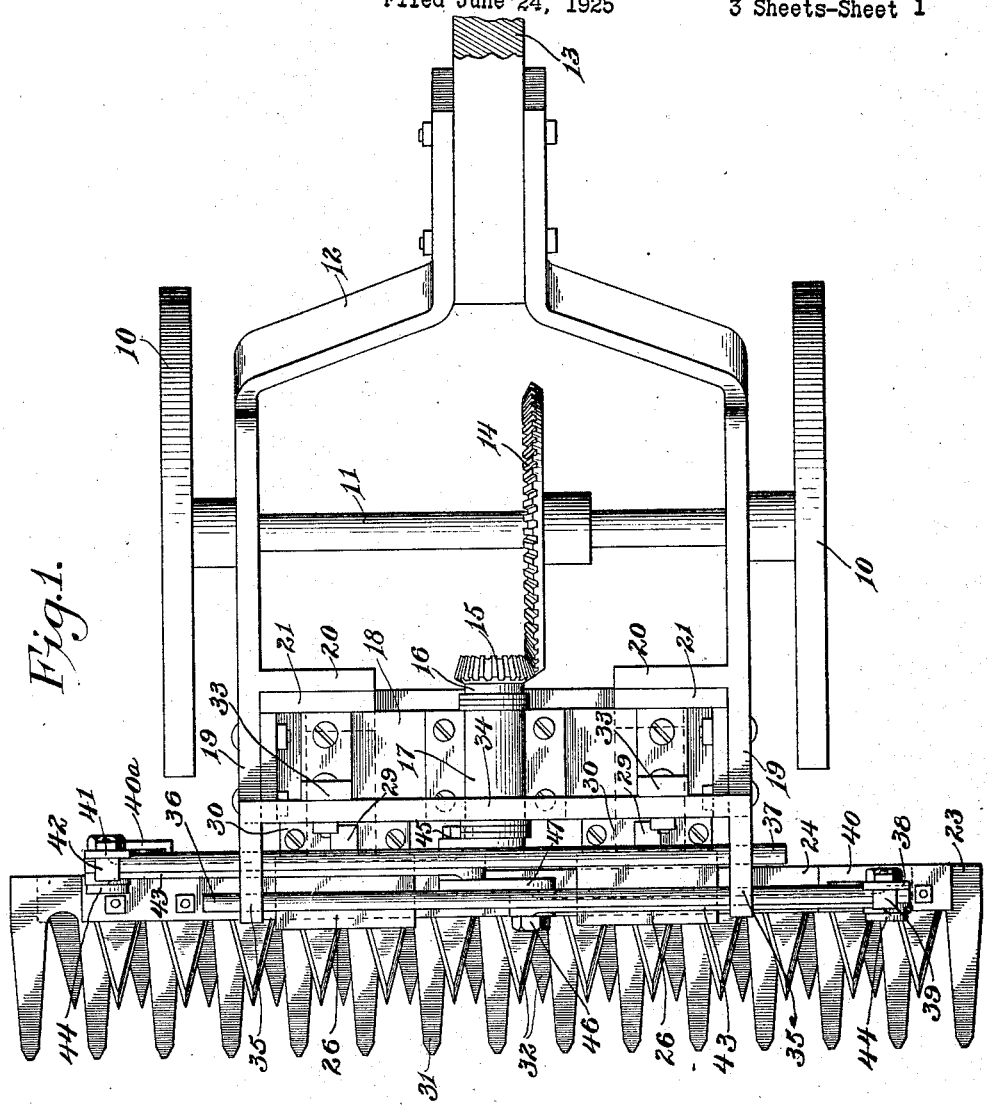
Figure 1 is a plan view of a lawn mower constructed in accordance with the invention.

The lawn mower, which constitutes the subject matter of the invention is provided with two ground wheels 10 connected in the usual manner to the ends of a shaft or axle 11, which is journaled in a yoke 12 secured to a rearwardly and upwardly extending beam 13 by means of which the mower is pushed over the ground. A beveled gear 14 is secured to the axle 11, and meshes with a pinion 15 secured to the rear end of a shaft 16 rotatably mounted in a bearing 17 on a transverse bar 18, the ends of which are secured to the forwardly extending arms 19 of the yoke 12.

The arms 19 are formed with inwardly extending vertically disposed plates 20 having brackets 21 secured to their front faces, and provided with forwardly extending horizontal arms 22 to the front end of which a transversely disposed finger bar 23 is secured. Knife bars 24 and 25 are mounted for reciprocation on the upper and lower faces, respectively, of the finger bar 23. Angular guide plates 26 are secured to the respective brackets 21, and extend over the knife bar 24, and are provided with transverse channels 27 in which the knife bar 24 is guided in its reciprocation. The forward ends of the arms 22 are provided with similar channels 28 for guiding the lower knife bar 25. Screws 29, mounted in brackets 30, assist in holding the arms 26 in proper relation to the finger bar 23 and the arms 22.

The finger bar 23 is thin and flat on both sides, and is formed with forwardly projecting integral fingers 31 constituting ledger blades, the upper and lower faces of which cooperate with the knife sections 32 secured to the respective knife bars 24 and 25.

Upstanding bracket arms 33 are secured to the transverse bar 18, and rigidly support a guide bar 34 having forwardly projecting ears 35 in which two horizontal rods 36 and 37 are supported for reciprocation. The front rod 36 projects laterally from one side of the mower, and has a depending arm 38 rigidly secured to its outer end by a clamping member 39 or the like. The rear rod 37 projects laterally from the other side of the mower, and has a similar depending arm 41 secured to its outer end by a clamping member 42. The upper knife bar 24 has a clip 40 secured near the end thereof, which is provided with a slot for receiving the lower end of the arm 38, while at the other side of the mower the lower knife bar 25 has a rearwardly projecting ear 40ª secured thereto, which is provided with a slot for receiving the lower end of the arm 41. The rods 36 and 37 are parallel to the knife bars, and since the depending arms 38 and 41 are rigidly secured to the respective rods, the knife bars are reciprocated simultaneously in opposite directions to the same extent that the rods 36 and 37 are reciprocated.

For the purpose of effecting the reciprocation of the rods 36 and 37 and the corresponding knife bars, two pitmen 43 are pivotally connected at their outer ends, as at 44, to the respective arms 38 and 41. The inner ends of these pitmen are pivotally connected respectively to the crank pins 45 and 46 of a double crank 47 formed on the front end of the shaft 16. As the lawn mower is pushed forwardly over the ground, therefore, the traction of the wheels 10 rotates the axle 11 and the beveled gear 14 secured thereto, and this, in turn, through the medium of the pinion 15, rotates the crank shaft 16 to reciprocate the knife bars.

In order to gage the height of the cut, it is preferred to support the front end of the frame by means of a roller 48, which is located midway between the sides of the frame and rotatably supported in bearings 49 secured to the brackets 30.

From the foregoing description, it will be noted that the knife bars are positively and accurately guided in their reciprocation by means of the arms 38 and 41 and the reciprocably mounted rods 36 and 37, so that there is no tendency of the knife bars to bind or stick in the channels in which they are mounted. The manner in which the fingers or ledger blades 31 are formed, and the disposition of the cutters on the upper and lower faces thereof, results in a clean and uniform cutting of the grass. Tall grass may be cut as well as short grass, and the knife bars extend laterally in front of and beyond the wheels, so that there is no possibility of treading the grass into the ground before it is cut. The cutters are reciprocated simultaneously in opposite directions, so that the mower is evenly balanced with very little vibration.

While I have shown and described the invention in detail in what is at present the preferred embodiment thereof, it is to be noted that various modifications may be made in the detailed construction and arrangement of the various elements without any material departure from the salient features of the invention. It is my purpose, therefore, to include all such modifications within the scope of the appended claims.

What is claimed is:

1. In a lawn mower, the combination of a frame, two knife bars reciprocably mounted transversely of the frame, two rods mounted above and parallel to the respective knife bars, guides in which the rods are reciprocable, an arm rigidly secured to each rod and depending therefrom, said knife bars having slots in which the lower ends of the respective arms are fitted, a substantially horizontal crank shaft disposed midway between the sides of the frame above said knife bars and below said rods and having oppositely disposed crank pins, pitmen connecting the respective crank pins to the intermediate portions of the respective arms, and means for rotating the crank shaft to reciprocate said knife bars.

2. In a lawn mower, the combination of a frame, a finger bar secured transversely thereof and consisting of a thin flat strip with integral, forwardly-projecting fingers constituting ledger blades, two knife bars guided for reciprocation respectively on the upper and lower faces of the finger bar, two rods mounted for reciprocation above the finger bar and parallel thereto, means for actuating said rods, and means secured to the respective rods and engaging the respective knife bars to reciprocate the latter.

3. In a lawn mower, the combination of a frame, a finger bar mounted transversely thereof, two knife bars guided for reciprocation on the finger bar and cooperating therewith, two rods mounted above and parallel to the finger bar, guides in which the rods are reciprocable, an arm rigidly secured to each rod and depending therefrom, the lower ends of the arms being engaged with the respective knife bars, a crank shaft disposed longitudinally of the frame and having oppositely disposed crank pins below the rods and above the knife bars, pitmen connecting the respective crank pins to the intermediate portions of the respective depending arms, and means for rotating the crank shaft to reciprocate the knife bars.

4. In a lawn mower, the combination of a frame, a finger bar supported transversely of the frame and consisting of a thin flat strip with integral, forwardly-projecting fingers constituting ledger blades, two knife bars guided for reciprocation respectively on the upper and lower faces of the finger bar, two rods located above and parallel to the finger bar, guides in which the rods are reciprocable, an arm secured to each rod and depending therefrom, the lower ends of said arms being engaged with the respective knife bars, a longitudinally disposed shaft located between the knife bars and the rods and having a double crank with oppositely disposed crank pins, pitmen connecting the crank pins to the intermediate portions of the respective depending arms, and means for driving said crank shaft to reciprocate the knife bars.

In testimony, that I claim the forgoing as my own, I have hereto affixed my signature.

ERNEST OLANDER HUTSELL.